United States Patent

[11] 3,545,342

[72] Inventor Karl Hiestand
    Pfullendorf, Musserer, Germany
[21] Appl. No. 753,265
[22] Filed Aug. 16, 1968
[45] Patented Dec. 8, 1970
[73] Assignee Firma SMW Spanneinrichtungen
    Schneider, Manz und Weisshaupt OHG
    Friedrichshafen, Germany
    a partnership of Germany
[32] Priority Sept. 9, 1967
[33] Germany
[31] No. H63,836

[54] PRESSURE FLUID SUPPLY APPARATUS
    9 Claims, 1 Drawing Fig.
[52] U.S. Cl. .................................................. 92/106,
    91/420, 138/44, 277/68, 277/75, 285/131,
    285/190
[51] Int. Cl. .................................................. F01b 31/00,
    F16l 15/00
[50] Field of Search .................................................. 92/106,
    119, 163; 277/(Inquire), 68, 69, 70, 71, 72, 75,
    206.1; 285/(Inquire), 131, 190; 308/(Inquire),
    36.2, 135; 138/44

[56] References Cited
    UNITED STATES PATENTS
1,851,723  3/1932  Neidow .................... 92/106X
2,322,440  6/1943  Highberg et al. ............ 92/106X
2,595,131  4/1952  Ehmann .................... 92/106X
2,700,561  1/1955  Svenson .................... 277/206.1
3,380,350  4/1968  Stewart .................... 92/106

FOREIGN PATENTS
192,851  11/1957  Austria .................... 92/106
788,186  7/1935  France .................... 285/190
655,576  1/1938  Germany .................... 285/190
721,600  1/1955  Great Britain ............ 285/190
803,084  10/1958  Great Britain ............ 308/M
937,479  9/1963  Great Britain ............ 308/135

Primary Examiner—Martin P. Schwadron
Attorney—Ernest F. Marmorek

ABSTRACT: Admitting means for a pressure fluid to a pressure fluid actuated apparatus, the apparatus having a cylinder element containing pressure fluid actuated means and having a cylindrical outer surface. The admitting means comprise a ring that surrounds said cylinder element and is slightly spaced from the outer surface. The ring has one (or more) annular groove that faces the outer surface of the cylinder element, with pressure fluid conduits connected thereto. The cylinder-element has pressure fluid channels terminating in said cylindrical surface opposite said groove. For sealing said groove against said cylindrical surface, an annular seal is placed in said groove.

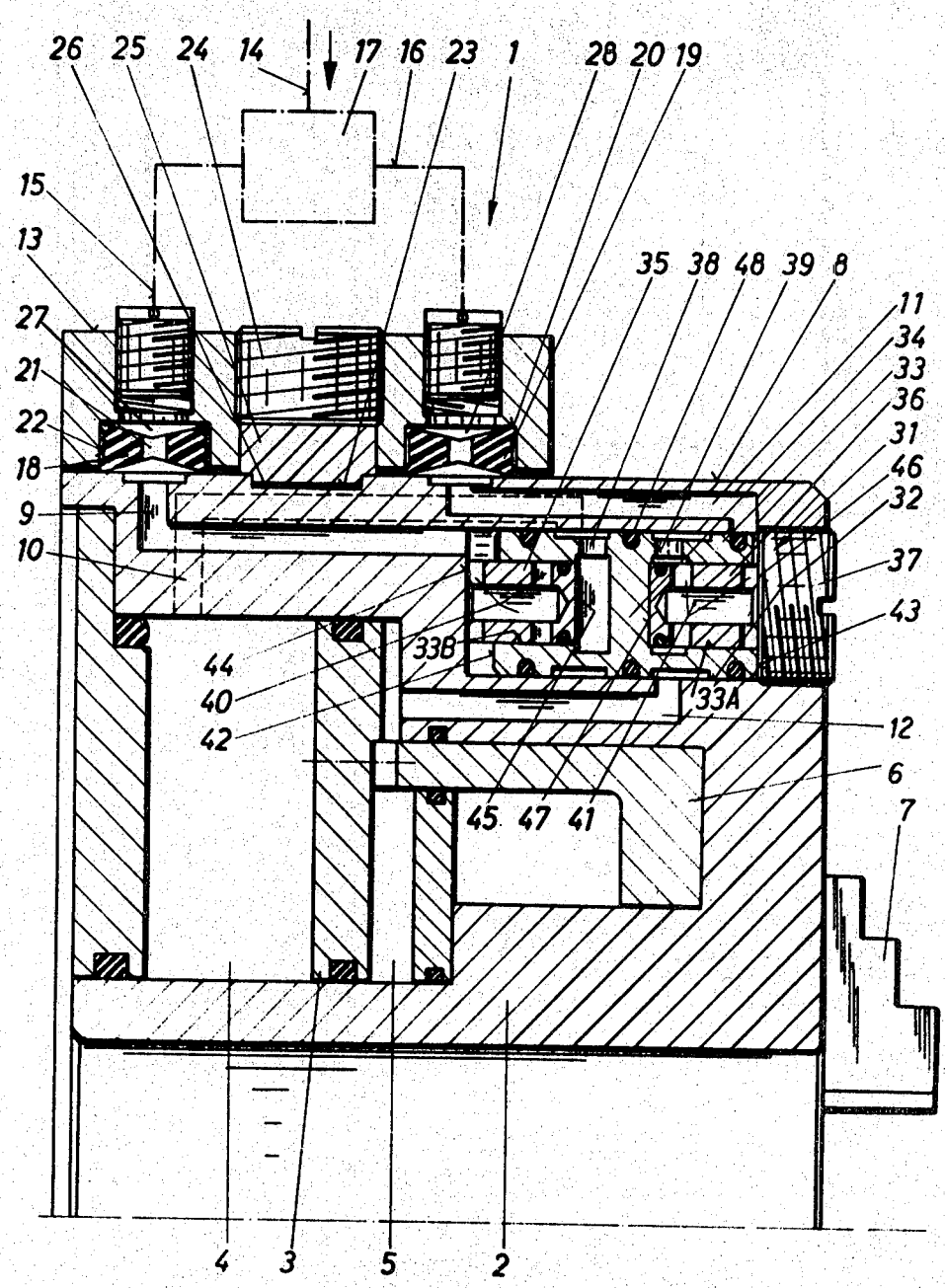

PRESSURE FLUID SUPPLY APPARATUS

The invention relates to means for admitting pressure fluid to a cylinder element provided, for example, with a piston actuated by the pressure fluid and forming part of a hydraulically or pneumatically operated chuck, clutch or the like. The pressure fluid admitting means comprise a ring that surrounds said cylinder element and is connected to pressure fluid supply conduits. One or more sealing elements are placed in said ring and/or said cylinder element. The invention is particularly concerned with a simplification of the construction and with an increase of the operating safety of such pressure fluid admitting means.

Admission of pressure fluid from a stationary pressure fluid conduit to a rotating cylinder, for example of a power operated chuck, of a clutch o r the like usually involves difficulties because the sealing means, due to friction, are often damaged so that there is no perfect pressure fluid supply.

In order o to prevent grinding of the gasket on a rotating cylinder for a compressed air actuated chuck it has been proposed to arrange an axially movable groove ring sleeve between a stationary ring connected to the compressed air supply and the front end of the cylinder which sleeve is pressed against the front surface of the cylinder by the incoming compressed air. Wear of the sealing sleeve is reduced in this manner; the expense of guiding and holding the ring connected to the compressed air conduit and receiving the seal, however, is considerable. Furthermore, particularly in the case of a cylinder provided with a double acting piston, it is usually not possible to arrange the pressure fluid supply pipes and the ring associated therewith at the front surface of the cylinder because these elements are adjacent to the other structural parts and are therefore not accessible. Placement of the pressure fluid conduits in the cylinder walls is connected with considerable difficulties.

It is accordingly among the principal objects of the present invention to provide an arrangement for supplying a pressure fluid to a cylinder whereby the controlled admission of pressure fluid to the pressure chambers of the cylinder is effected in a simple and reliable manner, and wear of sealing elements is substantially eliminated.

Other objects of the invention will in part be obvious and will in part appear hereinafter.

The aforesaid objects are obtained, according to the invention, by arranging a ring connected to pressure fluid supply conduits at the outer, cylindrical surface of the cylinder and guiding said ring at a slight clearance between the ring and the cylindrical surface, and by associating with each pressure fluid conduit a seal in an annular groove in the cylinder and/or the ring. Each seal in capable of passing pressure fluid therethrough and is provided with sealing lips which are elastically deformable.

For providing each seal with two lips resting on the cylinder and with two lips resting on the ring, it s is advantageous to make the cross-sectional configuration of the seal in the form of a double prism or composed of two mirror-symmetrically arranged portions which increase in radial direction with increasing distance from a narrow center portion. One or more apertures for passing pressure fluid are preferably provided in the central portion of the cross section of each seal.

The aforesaid apertures can be arranged to act as throttles. The lateral surfaces of each seal may have recesses between two lips. In this way the effect of the seal is additionally improved.

For holding and guiding the ring, which is connected to the pressure fluids conduits, one or more grooves or the like may be provided in the outer surface of the cylinder and/or in the ring, wherein the ring is guided in axial and radial directions by means of spacers set in the ring and/or the cylinder and preferably equally distributed on the ring and/or the cylinder. Preferably, the spacers comprise a threaded portion or the like which is screwed into the ring and/or into the cylinder at an end portion that is disposed adjacent the cylinder and/or the ring and provided with a wear resistant layer for example a layer of synthetic material; and/or the annular groove in the ring and/or the cylinder is provided with a wear resistant layer for example made of molybdenum.

Where the pressure fluid operated means is a piston placed inside a cylinder element and has two end faces, and each end face is actuated by a pressure fluid, it is of advantage to place a valve into a suitable recess in the cylinder-element for controlling the pressure fluid admission through pressure fluid supply conduits for admitting pressure fluid to one end of the piston and for releasing pressure fluid from the second end of the piston. The valve may comprise a double acting piston, for example a piston to both ends of which pressure fluid can be admitted.

The piston may have a longitudinal section in the form of the letter "H" the web of which forms the center portion of the piston wherein two spaced conduits are provided parallel to the web. These conduits terminate in the outside surface of the piston individually opposite one of the channels through which the flow of pressure fluid must be controlled. A control piston is placed in each of two axial recesses extending from the aforesaid center portion in opposite directions. Each control piston is adapted to be actuated on by pressure fluid and has pressure fluid channels so arranged as to open or close the aforesaid spaced conduits. Sealing means are provided for sealing said spaced conduits against one another.

An apparatus according to the invention for admitting a pressure to a cylinder or similar structural element is characterized by a simple structure and, above all, by always reliable operating behavior. As the ring or annular element connected to the pressure fluid conduits is arranged on the cylindrical outer surface of the cylinder element, and as the seal associated with each pressure fluid conduit is provided with sealing lips and is elastically deformable in its outer diameter, it is assured that the seal when no pressure fluid acts thereon s will resume its original configuration whereby it is lifted from the cylinder element. Therefore, no friction is possible between the seal and the cylinder element, which rotates when the apparatus is in operation, so that wear and operating disturbances connected therewith are almost completely avoided.

The seal whose sealing lips, due to the double prismatic cross section of the seal, come to lie pairwise on the cylinder element and on the annular element when pressure fluid is admitted, very reliably seals the clearance provided between said elements for reducing friction. Arrangement of the apertures or passages in the seal to act as a throttle, and the recesses in the end surfaces of the seal between the sealing lips, considerably assist the sealing effect.

By arranging the ring connected to the pressure fluid conduits on the cylindrical outer surface of the cylinder element avoids the need for additional building space particularly on the end surfaces of the cylinder element. This arrangement of the ring makes it possible, in almost all cases, to supply pressure fluid to a cylinder element in a simple manner without any necessity for special holding means and the like. The operating performance is further improved if the ring is supported by spacers formed according to the invention, for example if a wear resistant layer is provided either on the spacers or on the annular groove that receives the spacers.

The invention and additional objects and advantages thereof will best be understood from the following description of an embodiment thereof when read in connection with the accompanying drawing, the single view of which is a schematic longitudinal sectional view of a pressure fluid actuated apparatus equipped with fluid admission means according to the invention.

Means 1 are provided for supplying a pressure fluid from a supply conduit 14 to pressure chambers 4 and 5 of a cylinder 2 which forms a part of a power-actuated chuck. An axially movable piston 3 is placed in the cylinder 2 for actuating the jaws 7 of the chuck. The piston 3 is connected to the jaws 7 through an intermediate element 6 and helical gears, not shown, so that the jaws 7 are radially moved when the piston 3 is moved.

The pressure fluid supply means 1 comprises a distributing ring 13 that is mounted on the exterior surface 8 of the cylinder 2 and is slightly spaced therefrom; the ring 13 is held by spacers 24, 25 that are inserted in an annular groove 23 provided in the exterior surface 8 of the cylinder 2. In order to reduce the friction between the cylinder 2 and the spacers 24, 25 the latter may be in the form of threaded bolts 24 provided with a protuberance 25 made of wear-resistant synthetic material. For the same purpose a wear-resistant coat 26, for example a layer of molybdenum, may be sprayed onto the protuberance 25 or into the annular groove 23.

Seals 18 and 19 are inserted in recesses 27, 28, respectively, in the ring 13 and are associated with pressure fluid conduits 15, 16, respectively. The seals 18 and 19 have a double prismatic cross-sectional configuration, the radial extension of the cross section of the seals increasing with increasing axial distance from the center of the seals. One or more apertures 21 are provided in the seals 18 and 19 for throttling the flow of pressure fluid therethrough. Recesses 22 are formed in the surfaces of the seals 18 and 19 so that four sealing lips 20 are formed which rest pairwise on the exterior surface 8 of the cylinder 2 and on the ring 13 when pressure fluid is supplied through the pressure fluid conduit 15 or 16, depending on the position of the schematically shown control valve 17.

It is of course possible to use seals 18, 19 of a cross-sectional configuration which is different from that shown in the drawing. For example, the seals 18 and 19 may have two symmetrically arranged cross-sectional portions on which, by means of suitable recesses, sealing lips are provided on two or on all four exterior surfaces of the seals. It is of advantage to make the inner sealing lips which are adjacent the cylinder 2, quite strong in order to provide spare wear material in the event the ring 13 comes to rest on the cylinder 2 during operation.

For controlling the supply of pressure fluid, a valve 31 is provided which is inserted in a recess 32 of the cylinder 2, the recess being closed by a plug 37. The valve 31 comprises a piston 33 that has an "H" shaped longitudinal sectional configuration. The end surfaces 42 and 43 of the piston 33 are exposed to the pressure fluid admitted through pressure fluid conduits 9 and 11, respectively. A control piston 35 and 36, respectively, is placed in the piston 33 on either side of its web portion 34, the control pistons being provided with pressure fluid channels 40, 41, respectively, and can be moved by the pressure fluid acting on the end surfaces 44 or 45, or 46 or 47, respectively, so that the conduits 10 and 12 leading to the pressure chambers 4 and 5, respectively, can be connected to the conduits 9 and 11, by opening or closing the channels 38 and 39 that are provided in the piston 33 and sealed from one another by a seal 48.

When in the illustrated chuck a pressure fluid is to be admitted either to the pressure chamber 4 or to the pressure chamber 5, for example, for clamping a workpiece, now shown, by means of the jaws 7, pressure fluid is conducted from the pressure fluid conduit 14 through the control valve 17 either into the pressure fluid conduit 15 or into the pressure fluid conduit 16. When the pressure fluid flows into one of the recesses 27 or 28 of the distributing ring 13, the seal 18 or 19, respectively, is pressed with the four sealing lips 20 against the cylinder 2 and the ring 13, as the apertures 21 act as throttles, so that the clearance between the elements 2 and 13 is tightly sealed. The pressure fluid can then flow through the conduits 9 or 11 provided in the cylinder 2 to the valve 31 in order to act on one of the end surfaces, 42 or 43, respectively, of the valve piston 32.

If, for example, pressure fluids flows to the piston 32 through the pressure conduit 11, the piston 32 and the control piston 36 placed therein will be moved to the left, so that the pressure fluid can flow through the channels 41 of the control piston 36 and the channel 39 of the piston 32 into the conduit 12 in order to reach the pressure chamber 5 for acting on the piston 3. The control piston 35 will retain the position shown in the drawing whereas the piston 32 will be displaced by the aforesaid action, the pressure chamber 4 will be connected to the channel 9 through the channel 10, the channel 38 of the piston 32 and the channels 40 of the control piston 35. The pressure fluid in the pressure chamber 4 can therefore flow without hinderance from the chamber 4 so that the piston 3 is moved to the left by the pressure building up in the chamber 5 and the jaws 7 are displaced accordingly.

If oil is used as pressure fluid, it may be advisable to connect a separate return conduit to the control valve 17 for conducting the pressure fluid to an oil sump.

Upon release of pressure fluid, the pressure in the pressure chamber 5 will cause the control piston 36 to move to the right (in respect of the single view of the drawing) relative to the piston 32 and block the flow of fluid out of the chamber 5. Thus, the piston or actuating member 3 will be locked or maintained in its then actuated position. The control means includes the control valve 17, the movable valve or piston valve 31 having the piston 33 with recesses 33A and 33B on either side of the middle of the "H" section thereof, and control pistons 35 and 36.

I wish it to be understood that I do not desire to be limited to the exact details of construction shown and described, for obvious modifications will occur to a person skilled in the art.

I claim:

1. A pressure fluid actuated apparatus comprising, in combination:
   a cylinder element having a cylindrical outer surface;
   pressure fluid operated means disposed in said cylinder element;
   channels defined in said cylinder element extending to the exterior of said cylinder element for conducting pressure fluid into and from said pressure fluid operated means; and
   pressure fluid conducting means connected to said cylinder element operable for conducting pressure fluid to and from said channels and comprising:
      an annular element placed concentrically about said cylindrical outer surface;
      annular clearances being provided between said cylindrical surface and said annular element;
      annular recesses defined in said annular element and facing said cylindrical surface, said channels individually originating surface opposite said recesses; and
      an annular seal placed in each of said recesses actuatable by said pressure fluid each of said seals having apertures for passing pressure fluid therethrough, and each of said seals having end surfaces provided with sealing lips for sealing said annular element against said cylindrical surface.

2. A pressure fluid actuated apparatus, as claimed in claim 1, wherein each of said seals has a cross-sectional configuration including a narrow central portion and two mirror-symmetric portions extending from said central portion substantially parallel to the axis of the seals and increasing radially with increasing distance from said central portion, said apertures being in said central portion.

3. A pressure fluid actuated apparatus, as claimed in claim 1, wherein said apertures form throttles for throttling the pressure fluid passing therethrough.

4. A pressure fluid actuated apparatus, as claimed in claim 1, wherein said sealing lips are annular, one sealing lip extending in substantially axial direction from the outer periphery of each of said end surfaces, and a second sealing lip extending in substantially axial direction from the inner periphery of each of said end surfaces.

5. A pressure fluid actuated apparatus, as claimed in claim 1, comprising an annular groove defined in said cylinder element at and concentric with the cylindrical outer surface thereof, and spacer means connected to said annular element and having a portion extending into said groove for axially and radially guiding said annular element.

6. A pressure fluid actuated apparatus according to claim 5 wherein said spacer means have a portion in threaded engagement with said annular element, said portion of said spacer means extending into said groove including a wear-resistant coat.

7. A pressure fluid actuated apparatus according to claim 6 wherein said coat is made of synthetic material.

8. A pressure fluid actuated apparatus, as claimed in claim 1, comprising an annular groove defined in said cylinder element at and concentric with the cylindrical outer surface thereof, spacer means connected to said annular element and having a portion extending into said groove for axially and radially guiding said annular element, and a wear-resistant layer disposed in said groove.

9. A pressure fluid actuated apparatus according to claim 8 said layer being composed of molybdenum.